United States Patent [19]

Blaudez et al.

[11] Patent Number: 5,753,873
[45] Date of Patent: May 19, 1998

[54] PARKING BRAKE FOR A VEHICLE PROVIDED WITH A SELF-CLEANING GROUND CONTACTOR

[75] Inventors: Yann Blaudez, Saulcy Sur Meurthe; Jean Marc Belmond, Saint-Die, both of France

[73] Assignee: Dura Automotive Systems, Inc., Rochester Hills, Mich.

[21] Appl. No.: 797,979

[22] Filed: Feb. 12, 1997

[30] Foreign Application Priority Data

Feb. 13, 1996 [FR] France .................... 96 01757

[51] Int. Cl.⁶ .................................................. H01H 9/06
[52] U.S. Cl. .......................... 200/61.87; 200/335
[58] Field of Search .......................... 74/523, 535–538, 74/524–526, 575–578, 557; 192/4 A, 9; 200/61.85, 61.86, 61.87, 242, 244, 252, 253, 275, 332, 332.1, 332.2, 335; 497/71, 96

[56] References Cited

U.S. PATENT DOCUMENTS

| | | | |
|---|---|---|---|
| 4,212,211 | 7/1980 | Rickert | 74/538 |
| 4,275,280 | 6/1981 | Yamazaki | 200/61.85 |
| 4,395,603 | 7/1983 | Lauzier | 200/61.87 |
| 4,770,057 | 9/1988 | Foggini | 74/523 |
| 4,856,363 | 8/1989 | LaRocca et al. | 74/535 |
| 4,896,007 | 1/1990 | Yamazaki | 200/61.87 |
| 5,067,366 | 11/1991 | Gandiglio | 74/535 |
| 5,234,856 | 8/1993 | Yamazaki et al. | 74/538 |
| 5,321,219 | 6/1994 | Meagher et al. | 200/61.89 |

FOREIGN PATENT DOCUMENTS

| | | | |
|---|---|---|---|
| 2545978 | 11/1984 | France | H01H 21/62 |
| 22102203 | 6/1989 | United Kingdom | H01H 13/18 |

*Primary Examiner*—Cassandra C. Spyrou
*Assistant Examiner*—Michael A. Friedhofer
*Attorney, Agent, or Firm*—Michael K. Boyer

[57] ABSTRACT

Vehicle parking brake comprising a hand lever (1), a support (2) provided with a pin (6) on which the lever is pivotally mounted, a cam (7) mounted on the pin and connected to rotate with the lever, the cam being connected to braking means. An electric contactor (15) cooperates with the lever and is part of an electric circuit for lighting up an indicator light (17). The contactor comprises a conductive metal blade (19) and an insulating covering (21) surrounding the blade. End portions (19a, 19b) of the blade extend out of the covering. The contactor is so positioned relative to the cam that, in the lower position of the lever, the electric contact between a free end portion (19a) of the blade and the cam is broken and, on the contrary, established beyond a given angular position of the lever up to an upper position of the lever by a rubbing of the cam on the free end portion of the blade. The contactor has the advantage of great simplicity as it is reduced to two parts and is consequently inexpensive and moreover more reliable owing to the self-cleaning rubbing contact between the blade and the cam (7).

11 Claims, 5 Drawing Sheets

PARKING BRAKE FOR A VEHICLE PROVIDED WITH A SELF-CLEANING GROUND CONTACTOR

FIELD OF THE INVENTION

The present invention relates to a vehicle parking brake of the type comprising a hand lever adapted to be fixed to the floor of the vehicle, a cam which is mounted on a pin connected to rotate with the lever and is connected to braking means; the brake further comprises an electric contactor which cooperates with the lever and is part of an electric circuit of an indicator light of a console which is lit up when the lever moves beyond a given angular position to an upper position and the brake is being applied and is extinguished when the lever moves below the contact angle to a lower position and the brake is being released.

BACKGROUND OF THE INVENTION

Electric ground contactors employed up to the present time on brakes of this type require a relatively large number of parts: an electric wire, a spring, a terminal (often the contact itself), a push member, and fixing elements (screws).

Owing to this multiplicity of parts, the cost of the contactor is relatively high. Further, dust or other impurities may become deposited between the terminal and the mobile contact and in this way prevent the lighting up of the indicator light.

SUMMARY OF THE INVENTION

An object of the invention is therefore to propose a brake provided with an electric contactor which is simplified so as to considerably reduce its cost price and which at the same time is more reliable in operation.

According to the inventon, the contactor comprises a conductive metal blade and an insulating covering surrounding the blade, end portions of the latter extending out of said covering, one of said end portions being connected through a conductive wire to a source of current and to the indicator, said contactor being mounted on the support and so positioned relative to the cam that the electric contact is broken between a free end portion of the blade and the cam in the lower position of the lever and, on the contrary, is established beyond a given angular position of the lever up to the upper position thereof by a rubbing of the cam on said free end portion and the grounding of the conductive wire.

Thus the rotation of the cam with the pin when the lever moves from the lower position to the upper position thereof causes the cam to rub on the free end portion of the blade and thereby close the electric circuit or, inversely, open said circuit when the lever moves from the upper position to the lower position thereof, while cleaning by a rubbing action the path of contact between the free end portion of the blade and the surface of the cam.

The insulating covering, made from a suitable plastics material, electrically insulates the blade while allowing it to be mechanically fixed on the support receiving it..

The design of the contactor according to the invention therefore enables it to group all the fuctions of a contactor with only two parts, the first being the conductive blade which performs a function of an electric contact, a spring, an electric track, and a terminal, and the second part being the insulating covering of the blade which ensures an electric insulation, the positioning of the captor and the fixing of the latter.

According to one embodiment of the invention, the cam and the associated free end of the conductive blade are disposed in parallel and contiguous planes, and said free end is bent so as to form a fold adapted to resiliently slide on the cam and furthermore provide a self-cleaning electric contact.

Owing to its simplicity, this contactor is moreover very inexpensive as compared with conventional contactors.

Further features and advantages of the invention will be appearent from the following description, with reference to the accompanying drawings which illustrates two embodiments of the invention by of non limitive examples.

DETAILED DESCRIPTION

Figure 1:
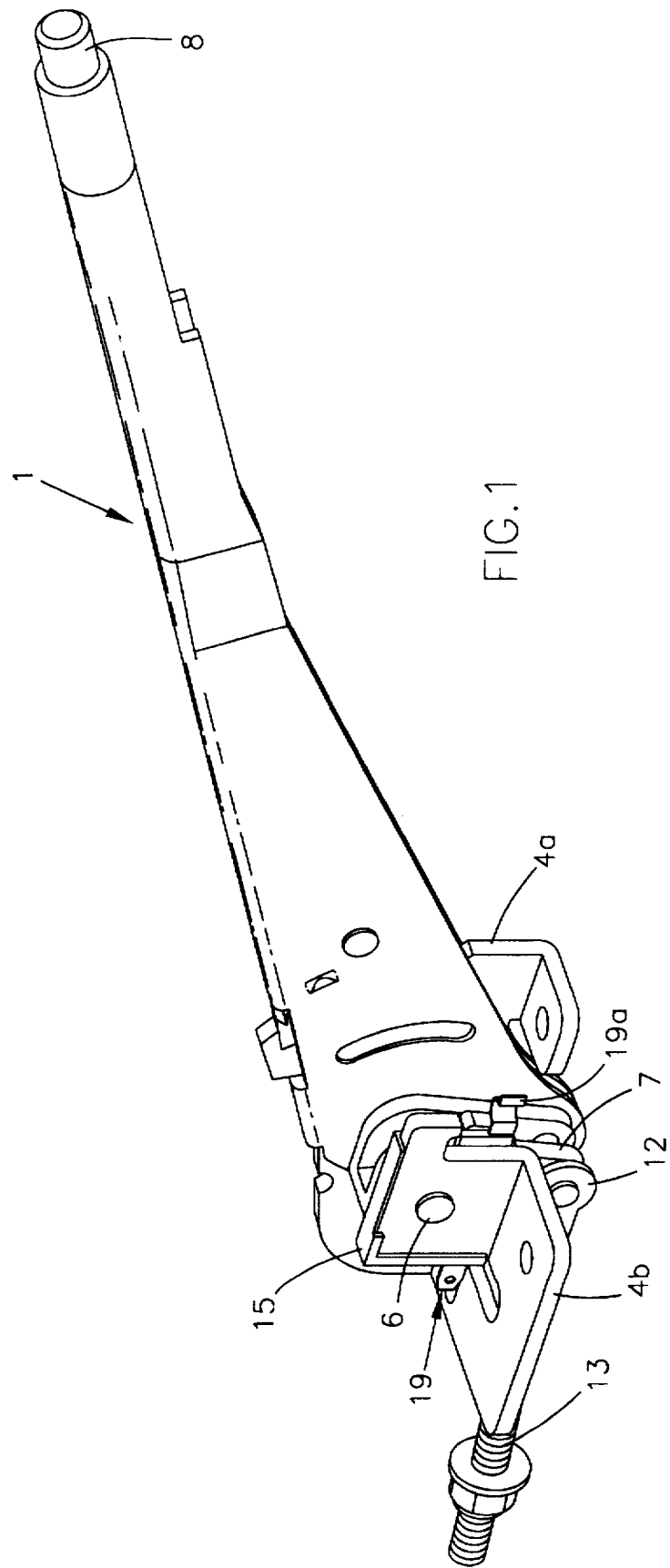
FIG. 1 is a perspective view to a reduced scale of an embodiment of the vehicle parking brake according to the invention.
Figure 2:
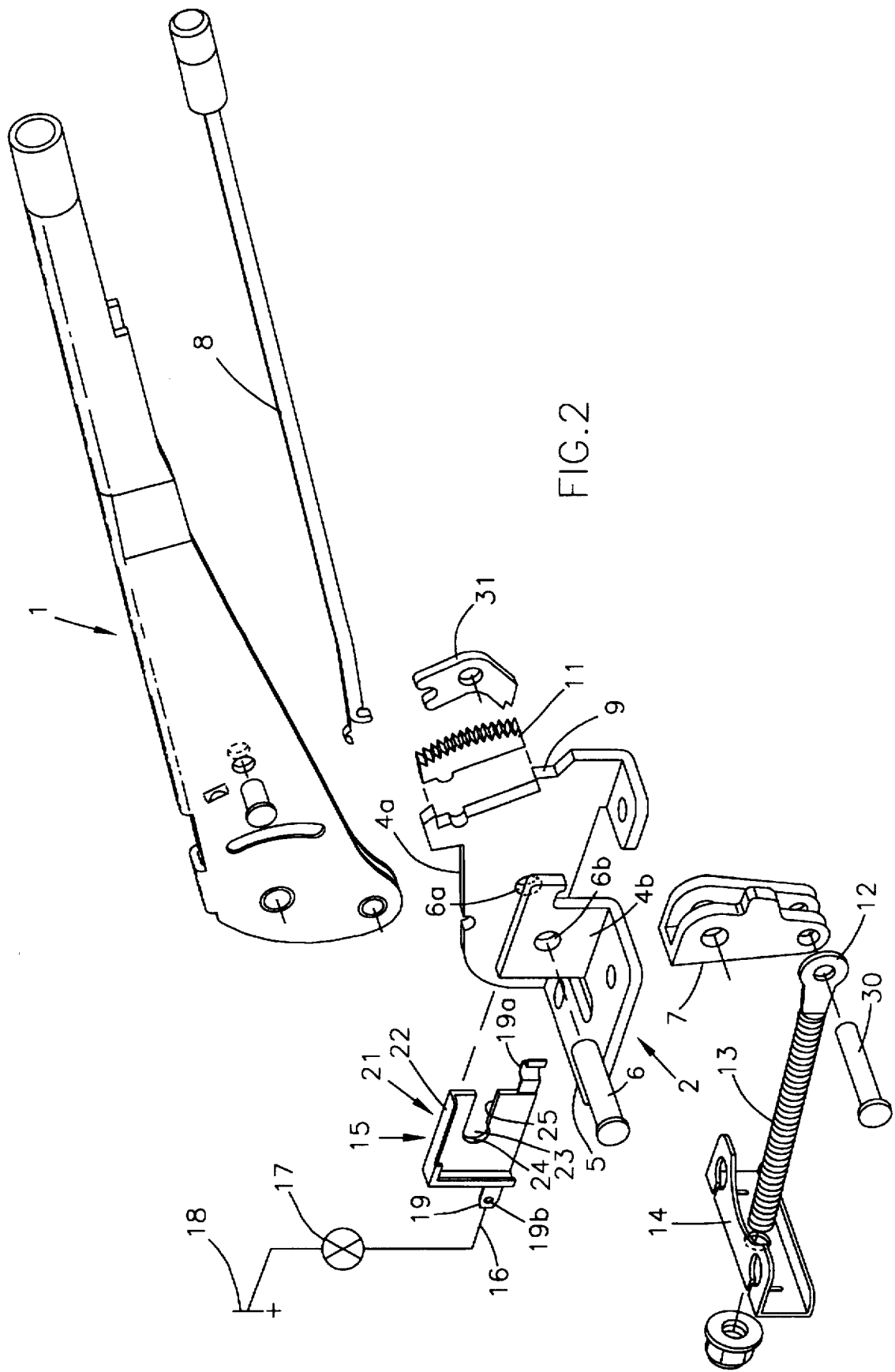
FIG. 2 is an exploded perspective view of the brake of FIG. 1.
Figure 3:
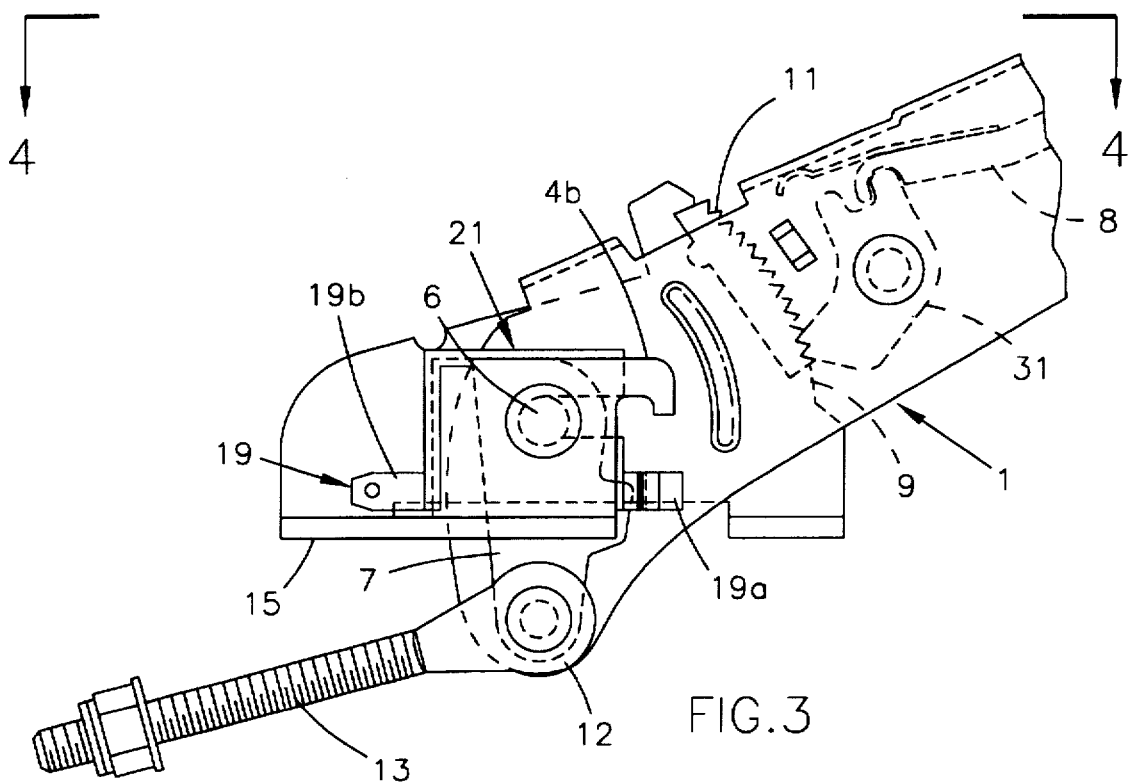
FIG. 3 is a partial side elevational view of the brake of FIGS. 1 and 2 without an electrical contact between the blade and the contactor and the cam when the lever is in the lower position.

The parking brake for a vehicle shown in FIGS. 1 to 6 comprises a hand lever 1, a support 2 comprising two parallel side walls 4a, 4b interconnected by a base 5, a pin 6 carried by the side walls, 4a, 4b the ends of the pin being for this purpose engaged in openings 6a, 6b in said side walls, and a cam 7. The latter has the pin 6 extending therethrough and is mounted between the side walls 4a, 4b and connected to rotate with the lever 1 which includes an inner push member 8.

The side wall 4a is extended by a portion 9 on which is provided a toothed sector 11 with which engages a pawl 31 which cooperates with the pushmember for setting the angular position of the lever 1. A rod 13 is pivotally mounted by its end portion 12 on a pin 30 which extends through the cam 7 and is fixed to the latter. This rod is associated with a brake equalizer 14 and connected to braking means (not shown). The base 5 of the support 2 is adapted to be fixed to the chassis (not shown) of the vehicle.

The brake further comprises an electric contactor 15 connected by an electric wire 16 to an indicator light 17 placed on the console of the dashboard (not shown) and itself connected to the+terminal of a source 18 of electric current such as the battery of the vehicle.

The contactor 15 comprises a conductive metal blade 19 and an insulating covering 21, made of a suitable plastics material, surrounding the blade 19, whose end portions 19a, 19b extend beyond the covering 21 on each side. The free end portion 19a is bent so as to form a wide-open substantially V-shaped pleating, while the opposite end portion 19b is connected to the electric wire 16.

The insulating covering 21 is moulded around the blade 19 and is adapted to be mounted on the side wall 4b of the support 2 which is in electric contact with the chassis of the vehicle when the brake is mounted in the latter.

Figure 4:
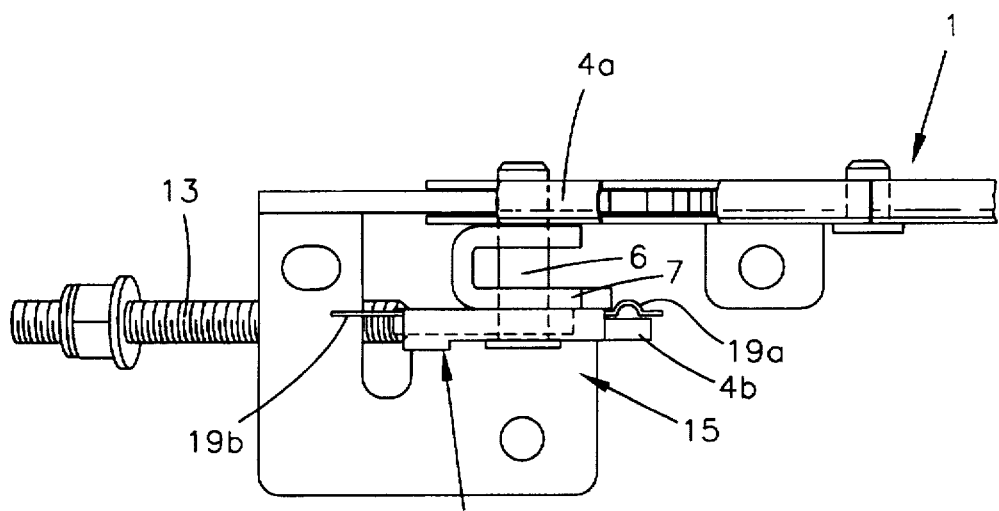
FIG. 4 is a plan view corresponding to FIG. 3.
Figure 6:
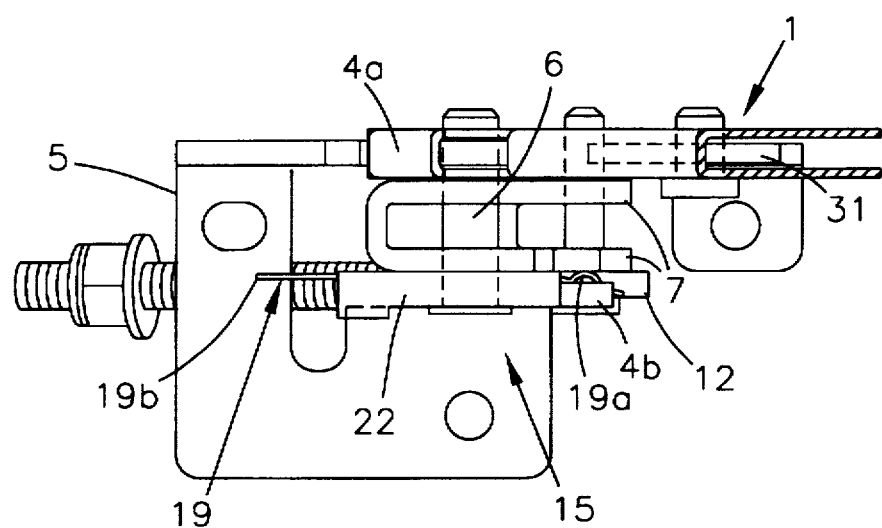
FIG. 6 is a plan view of the brake of FIG. 5.

The insulating covering 21 extends in a general direction parallel to the blade 19 which it surrounds in its lower part, and includes along its upper edge (FIG. 2) a right-angled rabbet 22 adapted to come to bear against the upper edge of the side wall 4b when the covering 21 and the blade 19 are slipped between the side wall 4b and the cam 7 (FIGS. 4 and 6). There is formed in the covering 21 a notch 23 which has a substantially U shape and extends roughly parellel to the blade 19, with a rounded inner end 24 adjacent to the end portion 19b. The profile of the notch 23 is adapted to be applied on the pin 6 when the contactor 16 is mounted on the support 2.

Figure 8:
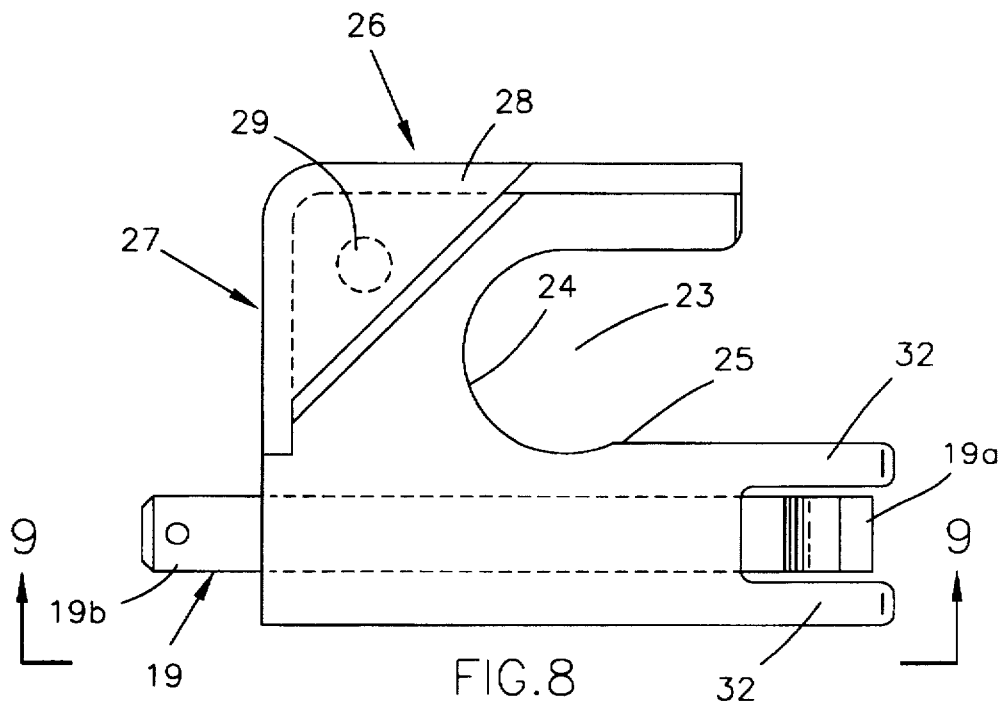
FIG. 8 is a side elevational view to a larger scale of the contactor of FIG. 7.

Means for clipping the covering 21 in position on the pin 6 are also provided, for example a step 25 which is more clearly shown in FIG. 8.

This step is arranged on one of the sides of the notch 23 in a suitable place for positioning just beyond the pin 6 after the insulating covering 21 is fitted on the pin. The clipped assembly obtained in this way maintains the contactor 15 in the desired position between the side wall 4b and the conductive cam 7.

When the brake is assembled, the cam 7 and the blade 19 are disposed in adjoining parallel planes, the contactor 15 being interposed between the side wall 4b and the cam 7.

The brake provided with the electric contactor just described operates in the following manner.

In the lower position and in the intermediate position (FIGS. 3 and 4), cam 7 remains in contact with the insulating covering 21 without touching the bent end portion 19a of the conductive blade 19. The electric contact is therefore broken and the indicator light 17 remains extinguished.

Figure 5:
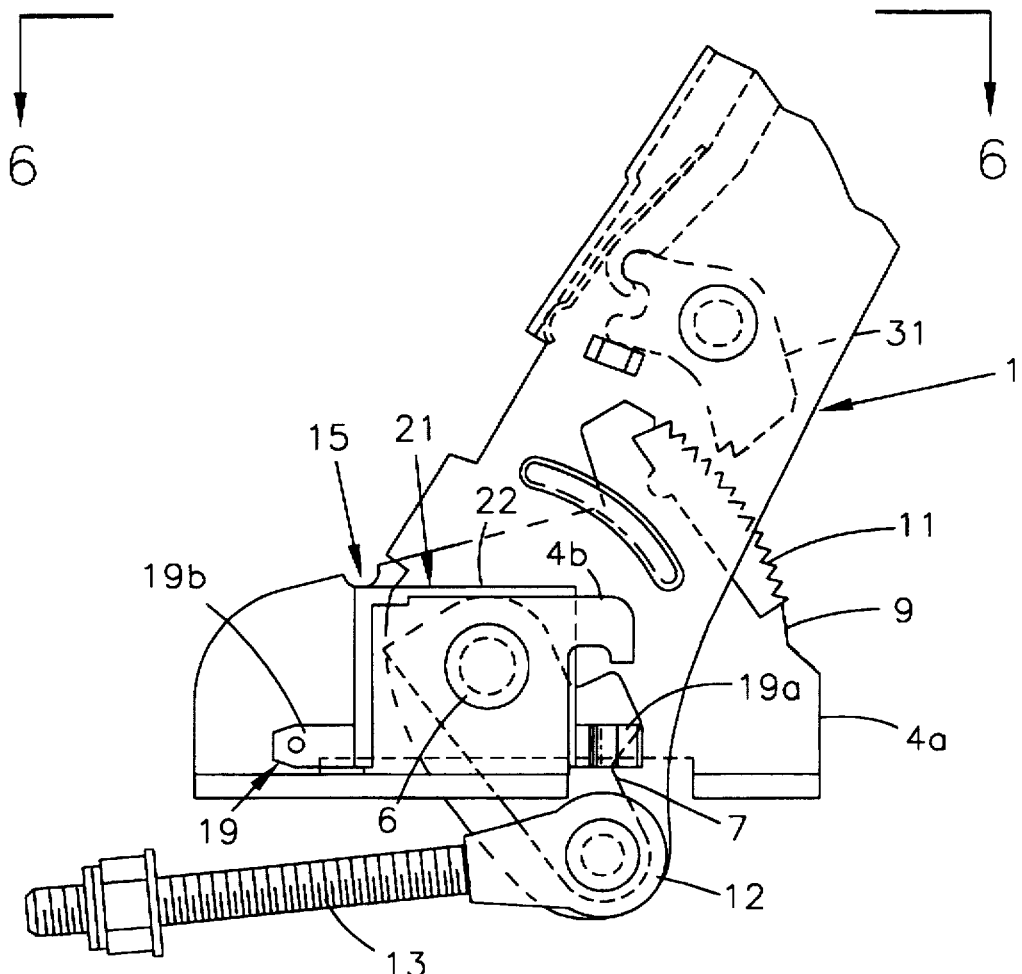
FIG. 5 is a view similar to FIG. 3 showing the position of the brake with a definite electric contact between the free end of the blade and the cam.

When the driver of the vehicle continues to raise lever 1 to the angular position shown in FIGS. 5 and 6, the cam 6 comes in contact with the bent pleating 19a which closes electric circuit, grounds the wire 16 via the pin 6 and the support 2 and lights up the indicator light 17. This contact produces a self-cleaning rubbing between the surface of the cam 7 and the free end portion 19a.

Moving the lever 1 in the opposite direction opens the contact between the cam 7 and the end portion 19a so that the current is cut of f and the light 17 is extingushed, the brake being released.

The covering 21 permits taking up play between the rotatable cam 7 and the fixed support 2 owing to the fact that it is interposed between these two elements.

In addition to the previously mentioned advantages, the contactor 15 according to the invention has the advantage of being reduced to only two parts, namely the conductive blade 19 and the insulating covering 21. This considerably simplifies its manufacture and reduces its cost as compared with the cost of conventional contactors.

Figure 7:
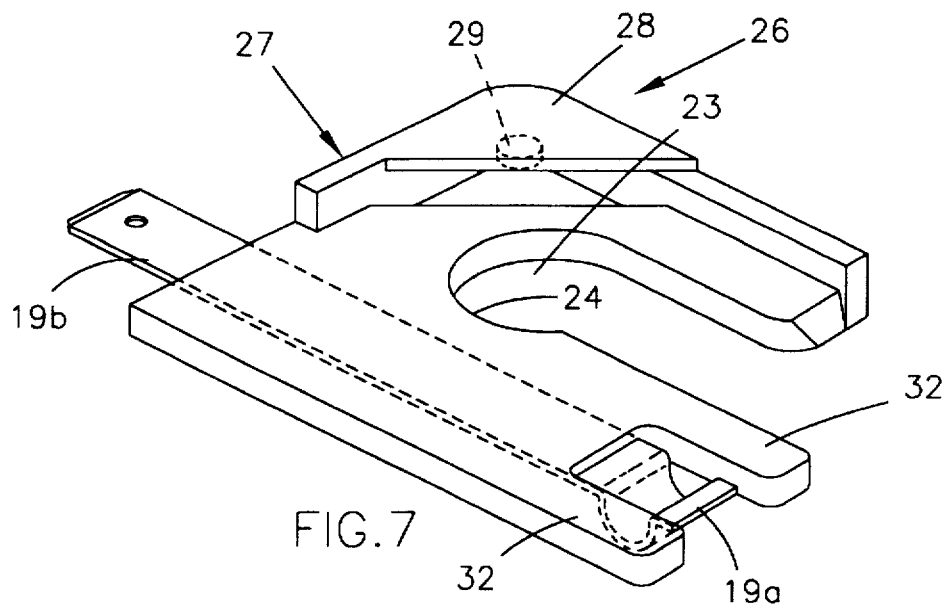
FIG. 7 is perspective view to a larger scale of a second embodiment of the electric contactor according to the invention.
Figure 9:
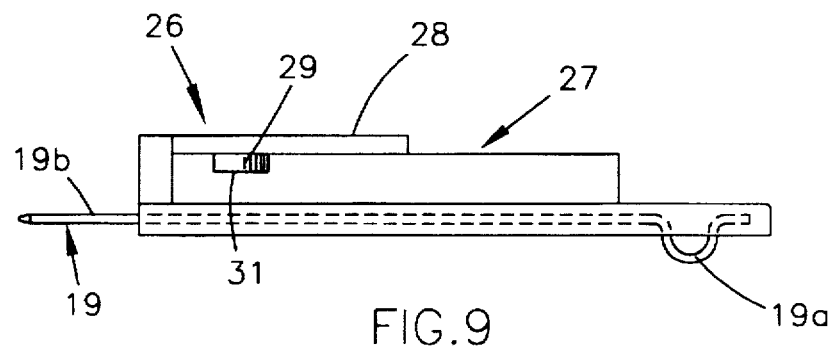
FIG. 9 is a plan view of the contactor of FIG. 8.

In the second embodiment of the contactor illustrated in FIGS. 7 to 9, the contactor 26 comprises an insulating covering 27 provided in one of its corners with a hollow portion 28 constituting a kind of hood which may cap one of the corners of the side wall 4b. The hood 28 is provided with an inner stud 29 which is capable of being engaged in an opening 31 (FIG. 9) in the side wall 4b so as to lock the insulating covering 27 on the side wall 4b.

The covering 27 further comprises means for protecting the free end portion 19a of the conductive blade 19, for example, as shown, a pair of lugs 32 extending in a direction parallel to each side of the end portion 19a.

This second embodiment exhibits the same advantages as the described first embodiment. Further, the bent end portion 19a of the conductive blade 19 is protected on the sides thereof by the lugs 32 against shocks and the contactor 26 is positioned on the side wall 4b more firmly owing to the triangular hood 28 and its locking stud 29 which completes the clipping of the notch 25 on the pin 6.

Various alternative embodiments of the contactor according to the invention may be envisaged.

What is claimed is:

1. Vehicle parking brake comprising in combination: a hand lever, a support, a pin mounted on said support, said lever being pivotally mounted on said pin, a cam for connection to braking means and mounted on said pin and connected to rotate with said lever, and an electric contactor for cooperation with said lever and being part of an electric circuit for lighting up an indicator light, said indicator light being lit up when said lever is in an upper position and extinguished when said lever is in a lower position and the brake is released, said contactor further comprising a conductive metal blade and an insulating covering surrounding said blade, said blade having end portions extending out of said covering, a conductive wire connecting a first of said end portions to a source of current through said indicator light, said contactor being mounted on said support and so positioned relative to said cam that in said lower position of said lever, an electric contact between a second of said end portions of said blade and said cam is broken in said lower position of said lever and said electric contact is on the contrary established beyond a given angular position of said lever up to an upper position of said lever by a rubbing of said cam on the second end portion of said blade and a grounding of said conductive wire.

2. Brake according to claim 1, wherein said cam and said second end portion of said blade are disposed in parallel and adjoining planes, and said second end portion of said blade is bent so as to form a pleating which resiliently slides along said cam and thereby ensure a self-cleaning electric contact.

3. Brake according to claim 1, wherein said insulating covering is moulded around said support of said blade, said support being arranged to be in electric contact with a chassis of a vehicle when the brake is mounted in the vehicle.

4. Brake according to claim 3, wherein said insulating covering includes a notch having a substantially U shape with a rounded inner end and sides for application against said pin of said cam and said lever, means being provided for clipping said covering to said pin.

5. Brake according to claim 4, wherein said clipping means comprises a step arranged in one of said sides of said notch.

6. Brake according to claim 4, wherein said support comprises a side wall and said insulating covering comprises a hollow portion forming a hood which comes to cap said side wall of said support and is provided with an inner stud for locking on said side wall.

7. Brake according to claim 3, wherein said support comprises two side walls carrying said pin, said cam being disposed on said pin between said side walls, and said contactor being mounted on one of said side walls and interposed between said cam and one of said side walls.

8. Brake according to claim 1, wherein said insulating covering comprises means for protecting said second end portion of said blade.

9. Brake according to claim 8, wherein said protecting means comprise a pair of lugs extending on respective sides of said second end portion.

10. A brake comprising: a lever, a support means, a cam in functional connection to a braking means and connected to rotate with said lever, and an electric contactor associated with said lever and being part of an electric circuit for activating an indicator means, when said lever is in an upper position and extinguished when said lever is in a lower position and the brake is released, said contactor further comprising a conductive metal blade, said blade having end portions, a conductive wire connecting a first of said end portions to a source of current through said indicator means, said contactor being mounted on said support means and so positioned relative to said cam that in said lower position of said lever an electric contact between a second of said end portions of said blade and said cam is broken in said lower position of said lever and wherein said electric contact is established beyond a predetermined angular position of said lever by contacting said cam on the second end portion of said blade thereby completing the electric circuit.

11. Vehicle parking brake comprising in combination: a hand operated lever, a support means, said lever being pivotally mounted on said support means, a cam for connection to a braking means and mounted on said support means to pivot with said lever, and an electric contactor for cooperation with said lever and cam and connected to an electric circuit for activating an indicating means, said indicating means being activated when said lever is in an engaged position and extinguished when said lever is in a released position, said contactor further comprising a conductive metal, said metal being in electrical connection with said electrical circuit, said metal being so positioned relative to said cam that in said lower position of said lever and cam, said electrical circuit being formed when said cam contacts said metal, said electrical circuit is broken in said released position and said electric contact is established beyond a predetermined pivotal position of said lever to said engaged position.

\* \* \* \* \*